United States Patent
Takeda et al.

(10) Patent No.: US 7,725,597 B2
(45) Date of Patent: May 25, 2010

(54) NETWORK ADDRESS TRANSLATION TYPE FOR FLEXIBLE NEIGHBOR SELECTION IN OVERLAY NETWORKS

(75) Inventors: Yutaka Takeda, San Mateo, CA (US); Howard L. Berkey, III, San Mateo, CA (US); Payton R. White, Foster City, CA (US); Attila Vass, Foster City, CA (US)

(73) Assignee: Sony Computer Entertainment Inc., Tokyo (JP)

(*) Notice: Subject to any disclaimer, the term of this patent is extended or adjusted under 35 U.S.C. 154(b) by 314 days.

(21) Appl. No.: 11/839,241

(22) Filed: Aug. 15, 2007

(65) Prior Publication Data

US 2008/0270626 A1 Oct. 30, 2008

Related U.S. Application Data

(60) Provisional application No. 60/913,779, filed on Apr. 24, 2007.

(51) Int. Cl.
*G06F 15/173* (2006.01)
(52) U.S. Cl. .................. 709/238; 709/225; 709/245
(58) Field of Classification Search ............. 709/238, 709/245
See application file for complete search history.

(56) References Cited

U.S. PATENT DOCUMENTS

2004/0064693 A1* 4/2004 Pabla et al. ............. 713/168
2006/0182100 A1* 8/2006 Li et al. ................... 370/389
2007/0058631 A1* 3/2007 Mortier et al. ............ 370/392
2007/0076729 A1* 4/2007 Takeda .................... 370/401

OTHER PUBLICATIONS

International Search Report mailed on Jul. 2, 2008, for PCT Application No. PCT/US08/61156 filed on Apr. 22, 2008, 2 pages.
Stoica, I. et al., "Chord: A Scalable Peer-to-Peer Lookup Protocol for Internet Applications," *IEEE/ACM Transactions on Networking*, Feb. 2003, vol. 11, No. 1, pp. 17-32.

\* cited by examiner

*Primary Examiner*—Salad Abdullahi
(74) *Attorney, Agent, or Firm*—Townsend and Townsend and Crew LLP

(57) ABSTRACT

An overlay network uses flexible neighbor selection based on network address translation (NAT) to define routing between nodes. The NAT type is used as a flexible neighbor selection criteria, either alone or in conjunction with other criteria. A method of selecting a neighboring node for a first node in a distributed hash table network includes determining a desired key value for a node finger table entry and requesting a set of candidate neighboring nodes near this desired key value. The method determines a network address translation type of each of the set of candidate neighboring nodes and ranks the set of candidate neighboring nodes accordingly. The method selects one of the set of candidate neighboring nodes based on the ranking. The NAT types of candidate neighboring nodes are determined by sending probe messages or from data received from a central overlay network server.

35 Claims, 8 Drawing Sheets

NETWORK ADDRESS TRANSLATION TYPE FOR FLEXIBLE NEIGHBOR SELECTION IN OVERLAY NETWORKS

BACKGROUND OF THE INVENTION

The invention relates to the field of data networks, and in particular to peer to peer overlay networks. Peer to peer networks are distributed data networks without any centralized hierarchy or organization. Peer to peer data networks provide a robust and flexible means of communicating information between large numbers of computers or other information devices, referred to in general as nodes.

An overlay network is a logical or virtual network organization that is imposed on nodes connected by one or more types of underlying physical network connections. In an overlay network, nodes are connected by virtual or logical links, each of which can correspond with one or more paths in an underlying physical network. Overlay networks are typically implemented in hardware and/or software operating in the application layer or other top-level layer of an OSI network stack or other type of networking protocol.

One class of peer to peer overlay networks is referred to as distributed hash table overly networks. Distributed hash table overlay networks use a hash function to generate and assign one or more key values to a unique node. The set of all possible key values is referred to as a hash space. Nodes are organized in the hash space according to their assigned key values. The hash function is selected so that nodes are approximately evenly distributed throughout the hash space. Distributed hash table overlay networks are typically highly scalable, often supporting millions of nodes; robust, allowing nodes to join or leave frequently; and efficient, routing a message to a single destination node quickly.

There are numerous different types of distributed hash table overlay networks. One type of peer to peer overlay network is a chord network. The chord overlay network protocol is described in detail in "Chord: A Scalable Peer-to-peer Lookup Protocol for Internet Applications", Ion Stoica, Robert Morris, David Liben-Nowell, David R. Karger, M. Frans Kaashoek, Frank Dabek, Hari Balakrishnan, *IEEE/ACM Transactions on Networking*, Vol. 11, No. 1, pp. 17-32, February 2003.

Distributed hash table overlay networks such as Chord create finger tables for each node that specify neighboring nodes in the overlay network. Neighboring nodes typically have a hash or key value offset from the current node by a predetermined amount. Distributed hash table overlay networks such as Chord route data traffic by forwarding information through a sequence of one or more neighboring nodes until the data traffic reaches its intended destination.

Typical distributed hash table overlay networks create finger tables for each node by determining a desired destination key value for each finger table entry. The overlay network then selects the node with a key value closest to the desired destination key value as the neighboring node. For example, if a first node with a key value of 17 needs a neighboring node with a key value of approximately 33, the overlay network may select a second node with a key value 31 as the neighboring node.

In other distributed hash table overlay networks, flexible neighbor selection allows the overlay network to select any node within a specific range of the desired destination key value as the neighboring node. For example, if a first node with a key value of 17 needs a neighboring node with a key value of approximately 33, the overlay network may select a second node with a key value 31 or a third node with a key value of 27 as the neighboring node. Neighboring nodes can be selected using different criteria, such as round trip time, node capabilities, node bandwidth, network quality of service, and security.

It thus is desirable for an overlay network to select neighboring nodes using a criteria that is indicative of the nodes networking capabilities so as to optimize the overall performance of the overlay network.

BRIEF SUMMARY OF THE INVENTION

Systems and methods in accordance with various embodiments of the invention include overlay networks that use flexible neighbor selection based on at least network address translation (NAT) to define routing between nodes. In one such embodiment, the number and type of NATs between nodes is recognized as a substantial contributor to network delays and connection difficulties. Using NAT type as a flexible neighbor selection criteria, either alone or in conjunction with other criteria, nodes with more restrictive NAT can be assigned less critical and/or less bandwidth intensive roles in the overlay network, while nodes with less restrictive or no NAT are assigned more critical and/or more network bandwidth intensive roles.

In an embodiment, a method of selecting a neighboring node for a first node in a distributed hash table network includes determining a desired key value for a node finger table entry and requesting a set of candidate neighboring nodes. The method determines a network address translation type of each of the set of candidate neighboring nodes and a ranking of the set of candidate neighboring nodes. The ranking is based at least in part on the network address translation type of each of the set of candidate neighboring nodes. The method selects one of the set of candidate neighboring nodes based on the ranking and attempts to establish a connection with the selected candidate node. If the connection is successful, a reference is added to the first node's finger table entry.

In a further embodiment, the ranking is further based at least in part on the network address translation type of the first node. In an embodiment, the network address translation types of candidate neighboring nodes are determined by sending probe messages to candidate neighboring nodes and analyzing network traffic. In another embodiment, the network address translation types of candidate neighboring nodes are determined from data received from a central overlay network server.

BRIEF DESCRIPTION OF THE DRAWINGS

The invention will be described with reference to the drawings, in which.

DETAILED DESCRIPTION OF THE INVENTION

Figure 1A:
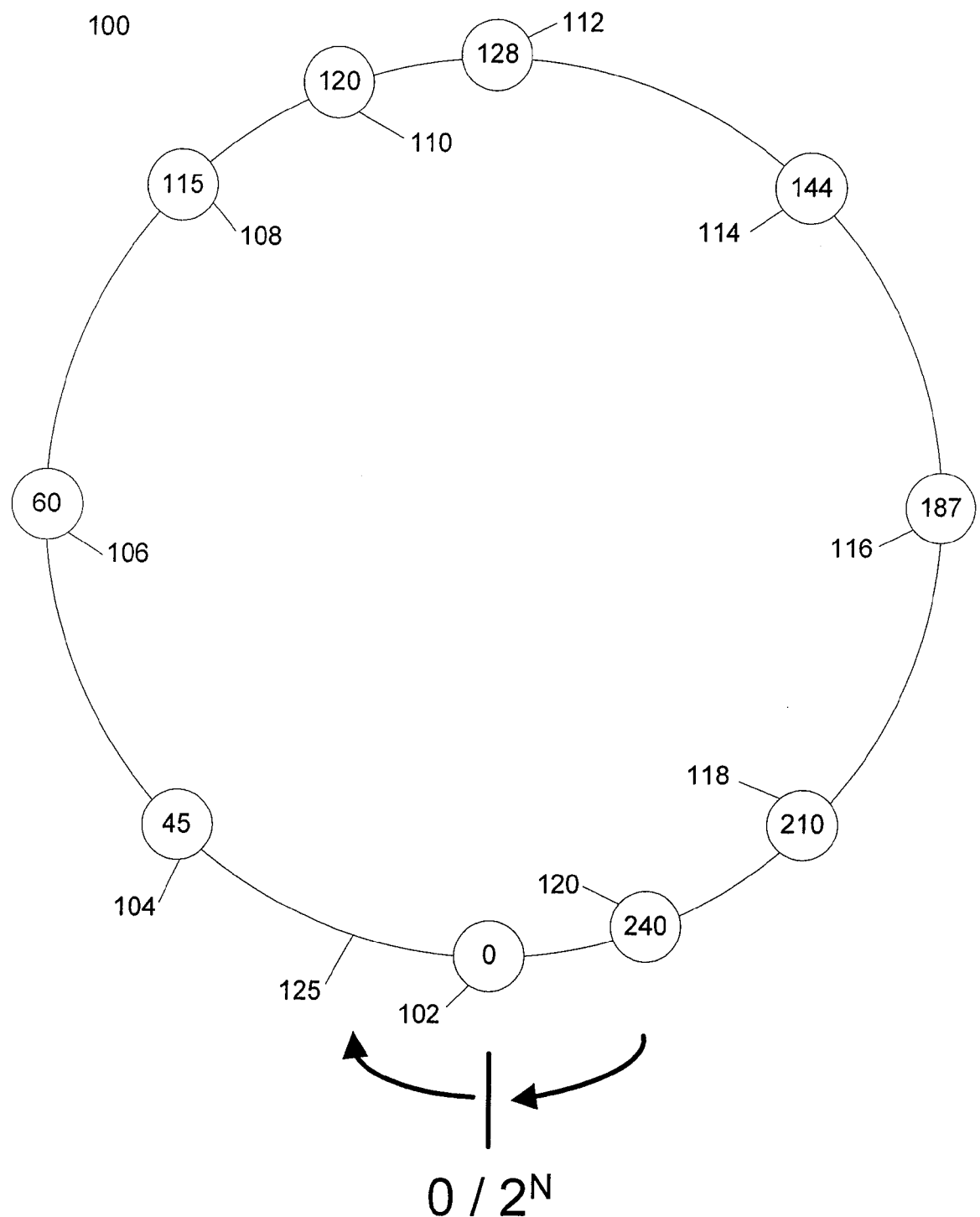
FIGS. 1A-1C illustrate flexible neighbor selection in an overlay network suitable for use with an embodiment of the invention.
Figure 1B:
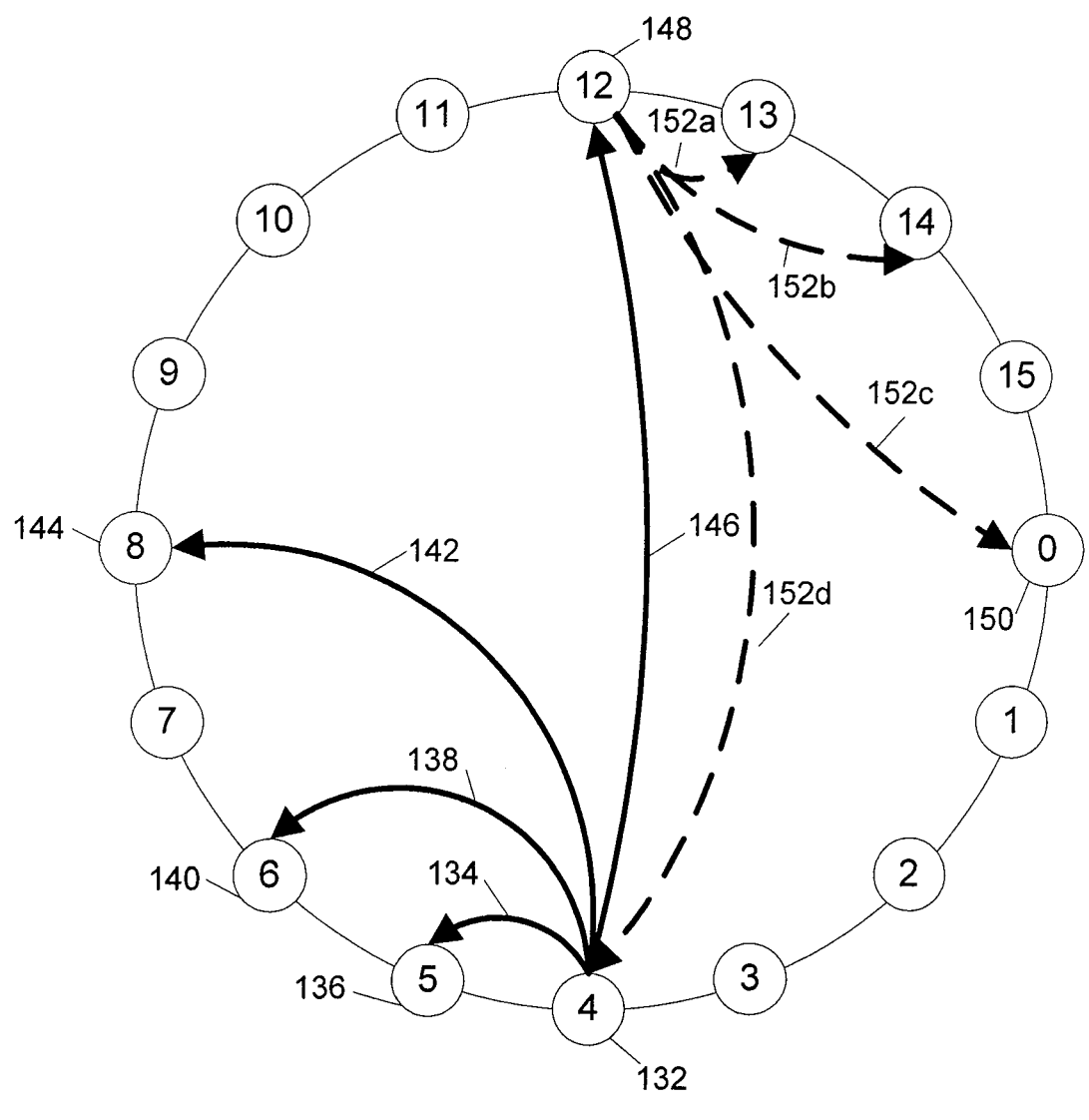
Figure 1C:
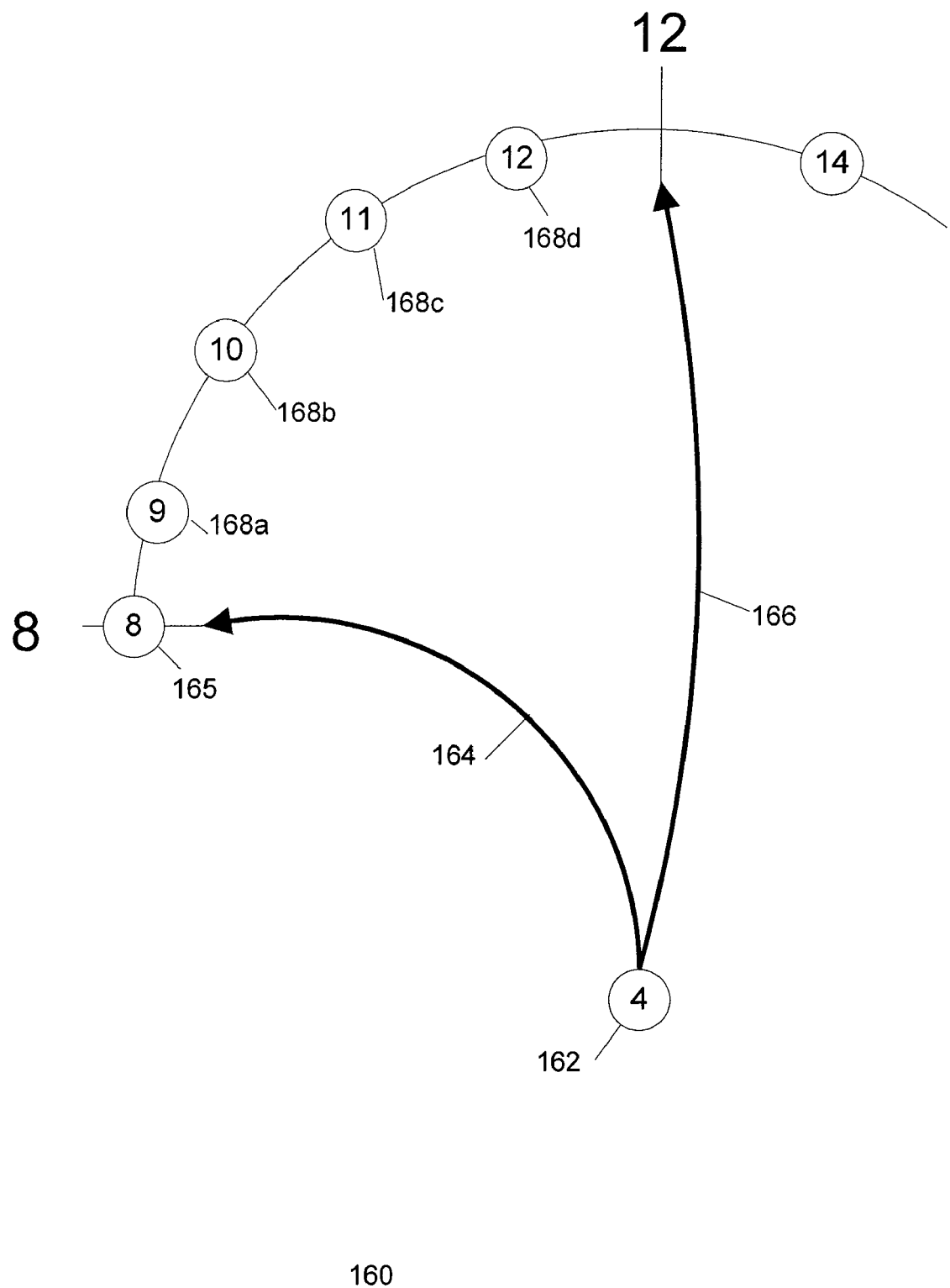

FIGS. 1A-1C illustrate flexible neighbor selection in an overlay network suitable for use with an embodiment of the invention. FIG. 1A illustrates an example chord overlay network 100 including numerous nodes, such as nodes 102, 104, 106, 108, 110, 112, 114, 116, 118, and 120. Each node is assigned one or more key values. For example, nodes 102, 104, 106, 108, 110, 112, 114, 116, 118, and 120 are assigned key values 0, 45, 60, 115, 120, 128, 144, 187, 210, and 240, respectively.

The nodes of the overlay network are arranged by their assigned key values in the hash space 125, or set of all possible key values. In FIG. 1A, the hash space 125 is shown as a ring configuration of all possible key values from 0 to $2^N$, with N being the number of bits allocated for a key value. In some implementations, N equals 160 bits, which is the size of the output of typical hash functions such as SHA-1 and is sufficiently large to avoid hash collisions. In this implementation, the chord overlay network 100 supports up to $2^{160}$ nodes and a typical chord overlay network can include millions of active nodes. Other implementations can use more or less hash bits.

In some implementations, each node is assigned a key value randomly. In some implementations, each node is assigned a key value based upon the results of a hash function of one or more attributes of the node. The hash function is selected so that nodes are approximately evenly and substantially randomly distributed throughout the hash space 125. In additional implementations, the assignment of key values to nodes is based at least in part on the topology of the underlying physical network. In these implementations, nodes are distributed approximately evenly throughout the hash space 125; however, the overlay network 100 can attempt to utilize a minimal number of hops to a destination node in the hash space 125 of the overlay network in order to conserve network resources.

Based upon the arrangement of nodes in the hash space 125, each node includes a reference to one or more other nodes. In some implementations of a chord overlay network 100, each node includes a reference to the preceding and succeeding nodes. For example, node 106, with a key value of 60, can include references to nodes 104 and 108, having key values of 45 and 115, respectively. If a new node is added with a key value between that of nodes 106 and 108, such as a key value of 100, the appropriate reference of node 106 will be adjusted accordingly.

In a further implementation, each node includes a finger table including references to one or more nearby or neighboring nodes. Each finger table entry references the node nearest to a key value specified by an offset from the key value of the present node. In some of these implementations, each finger table entry's offset corresponds with a binary place value. For example, a first finger table entry has an offset value of one ($2^0$), a second finger table entry has an offset value of two ($2^1$), a third finger table entry has an offset value of four ($2^2$), a fourth finger table entry has an offset value of eight ($2^3$), and so forth. In other implementations, different offset values can be associated with each finger table entry.

FIG. 1B illustrates an example of the node relationships specified by finger table entries in an overlay network 130 according to this implementation. Node 132, having a key value of four, includes a first finger table entry specifying a reference 134 to node 136, which has a key value of five, corresponding with an offset value of one. A second finger table entry of node 132 specifies a reference 138 to node 140, which has a key value of six, corresponding with an offset value of two from the node 132. Similarly, a third finger table entry of node 132 specifies a reference 142 to node 144, which has a key value of eight, corresponding with an offset value of four from node 132. A fourth finger table entry of node 132 specifies a reference 146 to node 148, which has a key value of twelve, corresponding with an offset value of eight from node 132. Each of the other nodes of overlay network 130 has a similar finger table specifying references to other nodes.

Finger tables can have any arbitrary number of entries. Larger finger tables can decrease routing time for messages, at the expense of more complicated maintenance overhead for adding or removing nodes. For example, if a key value is comprised of N bits, each node may have a finger table with N entries. In other implementations, other finger table sizes may be optimal depending upon the application.

In this implementation of an overlay network, each node only knows the location of the nodes specified by references in its finger table. However, nodes are capable of sending messages to any other node in the overlay network via one or more intermediate nodes. For example, if node 132 with a key value of 4 wants to send data to node 150 with a key value of 0, it first sends the data to neighboring node 148 via reference 146 of its finger table. Node 148 has a finger table with references 152a to 152d. Node 148 forwards the received data to its intended destination node 150 via reference 152c. In general, each node forwards data received to the neighboring node in its finger table with a key value less than or equal to the key value of the destination node.

In some distributed hash table overlay networks, flexible neighbor selection allows the overlay network to select any node within a specific range of the desired destination key value as the neighboring node. FIG. 1C illustrates flexible neighbor selection 160 for selecting a neighboring node for a node's finger table.

A node 162 has a first finger table entry 164 referencing a neighboring node 165 with a key value of 8. Node 162 has a second finger table entry 166 with a desired key value of 12. Without flexible neighbor selection, an overlay network will select the node closest to the desired key value as the node referenced by finger table entry 166. In this example, the overlay network would select node 168d, with a key value of 12, as the neighboring node for finger table entry 166.

With flexible neighbor selection, the overlay network can select any of the nodes having key values between the previous finger table entry 164 and the desired key value for the current finger table entry. For example, the overlay network can select any having a key value greater than 8, which is the key value of node 165, and less than or equal to 12. Thus, the overlay network can select either node 166a, 166b, 166c, or 166d as the neighboring node for finger table entry 166.

In prior overlay networks, neighboring nodes can be selected using different criteria such as round trip time, node capabilities, node bandwidth, network quality of service, and security. Embodiments of the invention include using network address translation type as a criteria for flexible neighbor selection.

Network address translation (NAT) changes the source and/or destination ports and addresses of network packets as they pass through a router, gateway, firewall, or other networking device that performs the network address translation. Network address translation is often used to allow multiple devices on a private or local-area network to interface with a wide-area network, such as the Internet, via a single wide-area network address. Network address translation is often used to enhance the security of devices and data on private networks, as each of the devices is typically assigned a private address that is not always accessible from hosts located in the wide-area network. This can be used to prevent malicious activity initiated by outside devices from reaching devices on private networks.

Unfortunately, devices behind a router or other NAT device do not have full connectivity with devices on the wide-area network. This can restrict or prevent devices behind a NAT device from using certain Internet protocols. For example, devices behind a NAT device must initiate TCP connections and typically cannot accept inbound connection requests from other devices. Other protocols such as UDP can be disrupted by NAT devices. Many of these restrictions can be overcome by using signaling servers and other techniques. However, these solutions require additional network resources.

In order to fully understand NAT behavior, it is necessary to introduce the concept of "NAT binding." NAT binding is established (by the NAT), for example, when an internal host sends a packet to an external host for the first time. The binding maintains a mapping between the local transport address, or a set of IP address and port number, and an external transport address assigned by NAT. Thus, any packet sent from the same internal host to the same external host will be assigned the same external port by the NAT as long as the binding exists. The binding has a lifetime that typically is on the order of about 30 seconds to about 5 minutes after the last packet (in or out) went through the NAT. Once this binding is created, the external host can reach the internal host by sending packets to the external transport address, but the external port may not be available for anyone in the WAN to reach the internal host.

Figure 2A:
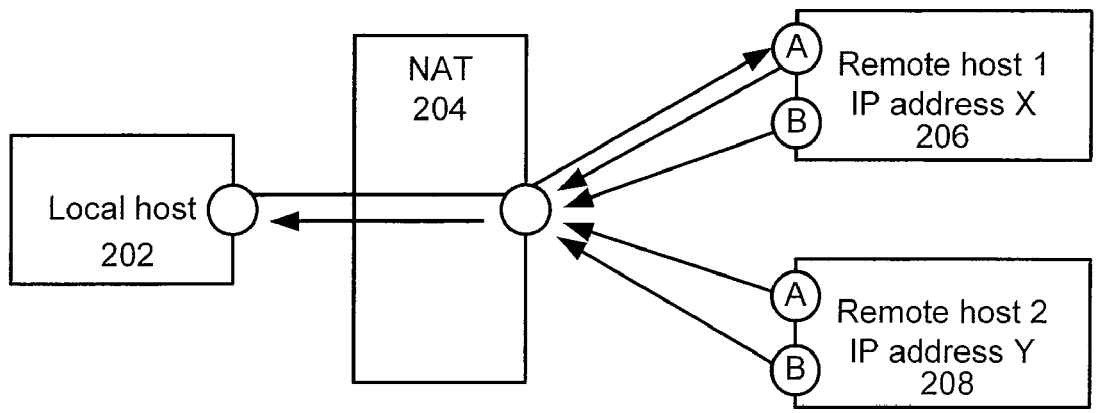
FIGS. 2A-2D illustrate different types of network address translation (NAT) suitable for use with flexible neighbor selection according to an embodiment of the invention.

NAT can be classified into a number of different types. FIGS. 2A-2D illustrate examples of different types of NAT. FIG. 2A illustrates a full cone NAT configuration 200. In a full cone NAT, the binding (in the NAT) is established when the local host sends a packet to remote host 1 206. The binding then enables the forwarding of packets from any external host to the internal host. For example, network traffic between local host 202 and remote host 1 206 and remote host 2 208 can be passed through the NAT 204, allowing traffic from multiple external IP addresses and ports.

Figure 2B:
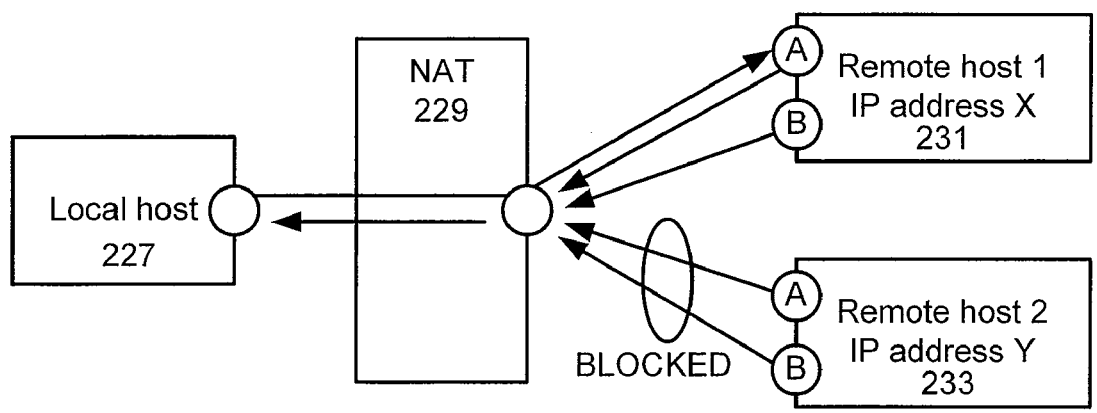

FIG. 2B illustrates a "restricted" cone NAT configuration 225. A restricted cone NAT is similar to a full cone NAT, except an external device can send a network traffic to the internal host only if the internal host had previously sent a packet to that external device using the same IP address. For example, if local host 227 sends a packet to remote host 1 231 at IP address X, then the NAT 229 will allow any packets from IP address X. The NAT device 229 blocks network traffic from all other IP addresses, such as IP address Y for remote host 2 233.

Figure 2C:
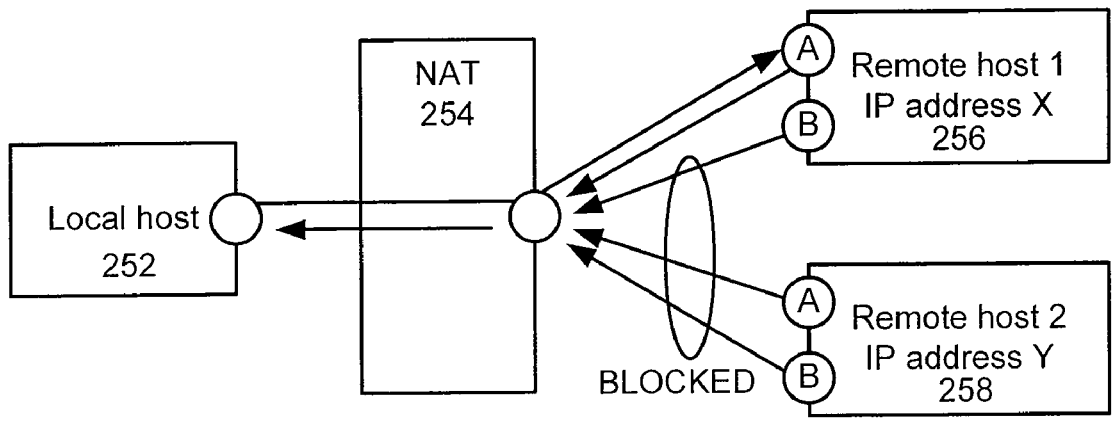

FIG. 2C illustrates a "port restricted" cone NAT configuration 250. A port restricted cone NAT is similar to a restricted cone NAT, except that the NAT in this case only allows packets from the same IP address and port (transport address) as established initially for a packet from the local host. For example, if local host 252 initially sends a packet to port A of remote host 1 256 at IP address X, then the NAT will allow any traffic from port A at IP address X. The NAT device 229 blocks network traffic for all other ports and all other IP addresses, including port B at IP address X and any port of remote host 2 258 at IP address Y.

Figure 2D:
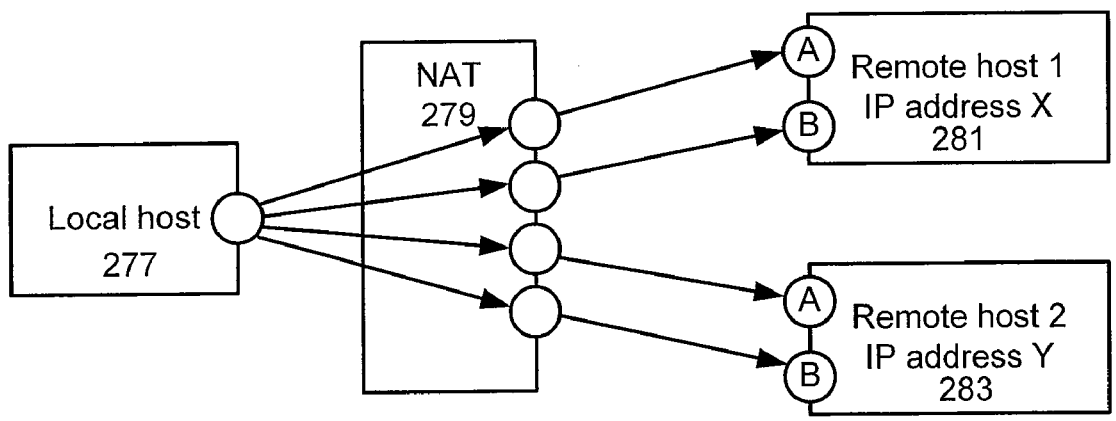

FIG. 2D illustrates a symmetric NAT configuration 275. A symmetric NAT configuration maps requests between a client and a specific destination to a unique external source IP address and port. Requests to other destinations are mapped to different external source IP addresses and ports. As can be seen, unique bindings are used to pass packets through the NAT 279 from local host 277 to each port at each IP address for remote host 1 281 and remote host 2 283.

An embodiment of the invention recognizes that the number and type of NATs between devices is a substantial contributor to network delays and connection difficulties. By using NAT type as flexible neighbor selection criteria, nodes with more restrictive NAT can be assigned less critical and/or less bandwidth intensive roles in the overlay network, while nodes with less restrictive or no NAT are assigned more critical and/or more network bandwidth intensive roles. For example, during a multiplayer online game, one device may be assigned a server role and be responsible for maintaining the state of the game. The other devices are assigned to client roles and receive updates of game state from the device acting as a server. To optimize game performance, the device assigned the server role can be a device with no NAT or a less restrictive NAT type, while devices with more restrictive NAT types are assigned client roles. This reduces potential network bottlenecks that could hinder game performance. Similarly, devices with no NAT or less restrictive NAT types can be selected for a relay server role to forward data to one or more other devices, while devices with restrictive NATs can be limited to communicating directly only with devices assigned relay roles.

Table 1 illustrates different combinations of NAT types and the overlay network performance issues associated with each combination according to an embodiment of the invention.

TABLE 1

NAT Type Combinations

| | Device 1 | | | | |
| --- | --- | --- | --- | --- | --- |
| Device 2 | Open | Full Cone NAT | Restricted Cone NAT | Port Restricted Cone NAT | Symmetric NAT |
| Open | Case 1 | Case 2 | Case 2 | Case 2 | Case 2 |
| Full Cone NAT | Case 2 | Case 3 | Case 3 | Case 3 | Case 3 |
| Restricted Cone NAT | Case 2 | Case 3 | Case 3 | Case 3 | Case 3 |
| Port Restricted Cone NAT | Case 2 | Case 3 | Case 3 | Case 3 | Case 4 |
| Symmetric NAT | Case 2 | Case 3 | Case 3 | Case 4 | Case 4 |

For case 1, there is no NAT between a pair of devices. These connections have the least amount of connection restrictions and may have the least amount of network delay or lag. Devices with these NAT types can be assigned more critical roles in the overlay network.

For case 2, there is one NAT between a pair of devices. These connections have some connection restrictions and more network delay than those in case 1, but still can have crucial roles in the overlay network.

For case 3, there are two NATs between a pair of devices, these connections have more network lag and restrictions than case 2 or case 1.

For case 4, there are two NATs and substantial connection restrictions between the devices. Port prediction techniques and/or a relay or signaling server may be required to maintain this type of connection.

Figure 3:
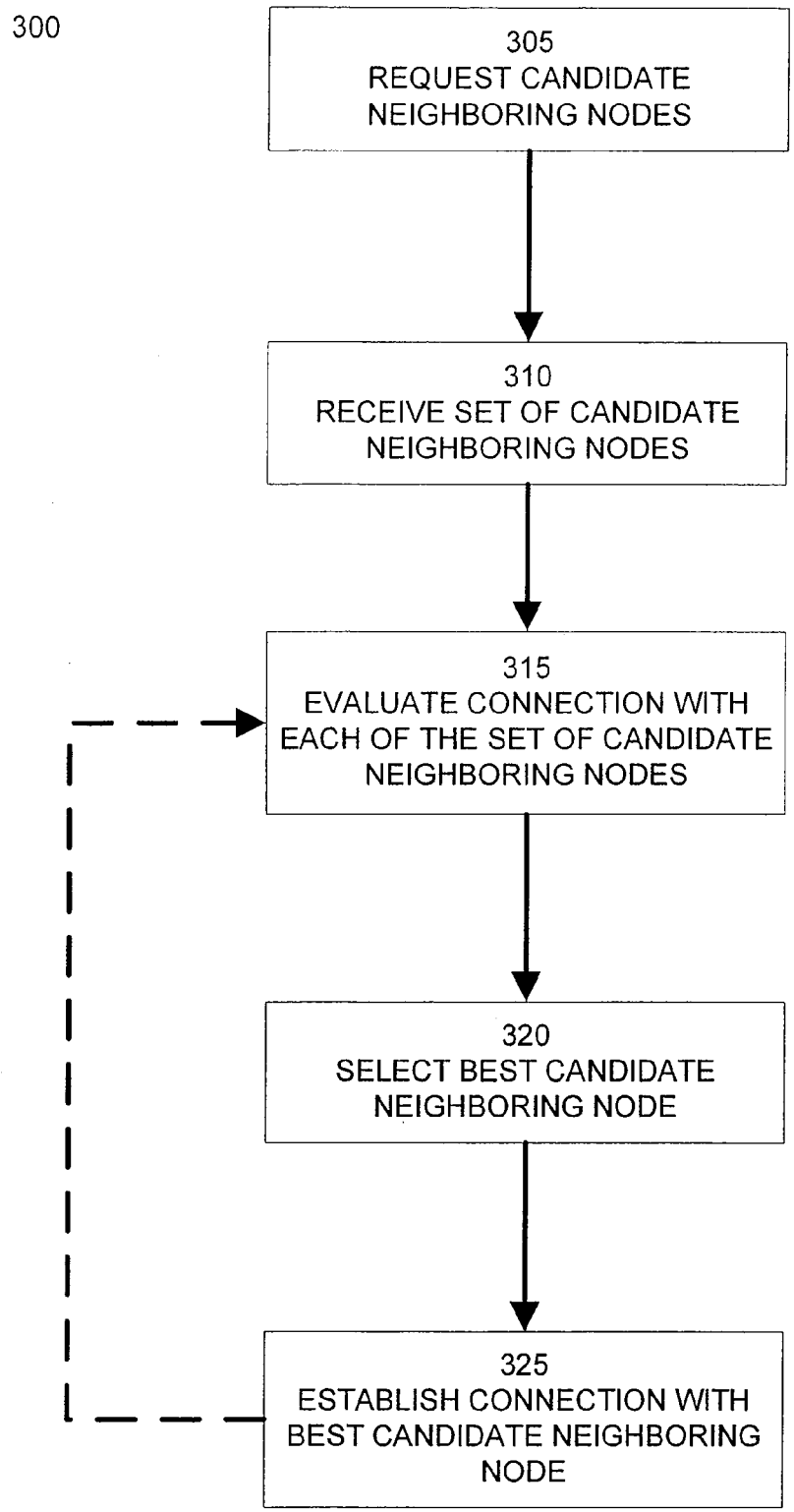
FIG. 3 illustrates a method for selecting a neighboring node according to an embodiment of the invention.

FIG. 3 illustrates a method 300 for selecting a neighboring node according to an embodiment of the invention. In step

305, a node makes a request to a central overlay network server for a set or list of candidate neighboring nodes having key values equal or nearby a desired key value. In an alternate embodiment, a node uses an autodiscovery protocol to create this set of candidate neighboring nodes In step 310, the node receives a set of candidate neighbor nodes. In step 315, the node then evaluates attributes of its connections with each of the candidate neighbor nodes to determine the best candidate neighbor node. In an embodiment, the node uses a weighting or scoring system to evaluate a combination of criteria, such as round trip time, node stability, device capabilities, network bandwidth, network quality of service, and security, in addition to the NAT type to rank the candidate neighboring nodes. In another embodiment, the node uses the NAT type alone as a heuristic for ranking candidate neighboring nodes.

In an embodiment, the node receives NAT type information for each of the candidate neighboring nodes from the central overlay network server in step 310. In another embodiment, the node sends each of the candidate neighboring nodes probe messages and uses network traffic analysis to deduce each candidate neighboring node's NAT type.

Based upon the ranking of candidate neighboring nodes, step 320 selects the best candidate neighboring node. Step 325 then attempts to establish contact with the selected neighboring node. If the contact is successful, then the selected candidate neighboring node is added to the node's finger table. If the contact is unsuccessful, then the selected candidate neighboring node is removed from the set of candidate neighboring nodes and method 300 proceeds back to step 315 to evaluate and select a different candidate neighboring node.

Embodiment of the invention can be implemented in a software application responsible for implementing the overlay network functionality of a device. This can include a software application, a software library, an implementation of an application programming interface, all or a portion of a network stack, an operating system, or a function in the device firmware. Additional embodiments can be implemented entirely or partially using hardware as opposed to software.

Figure 4:
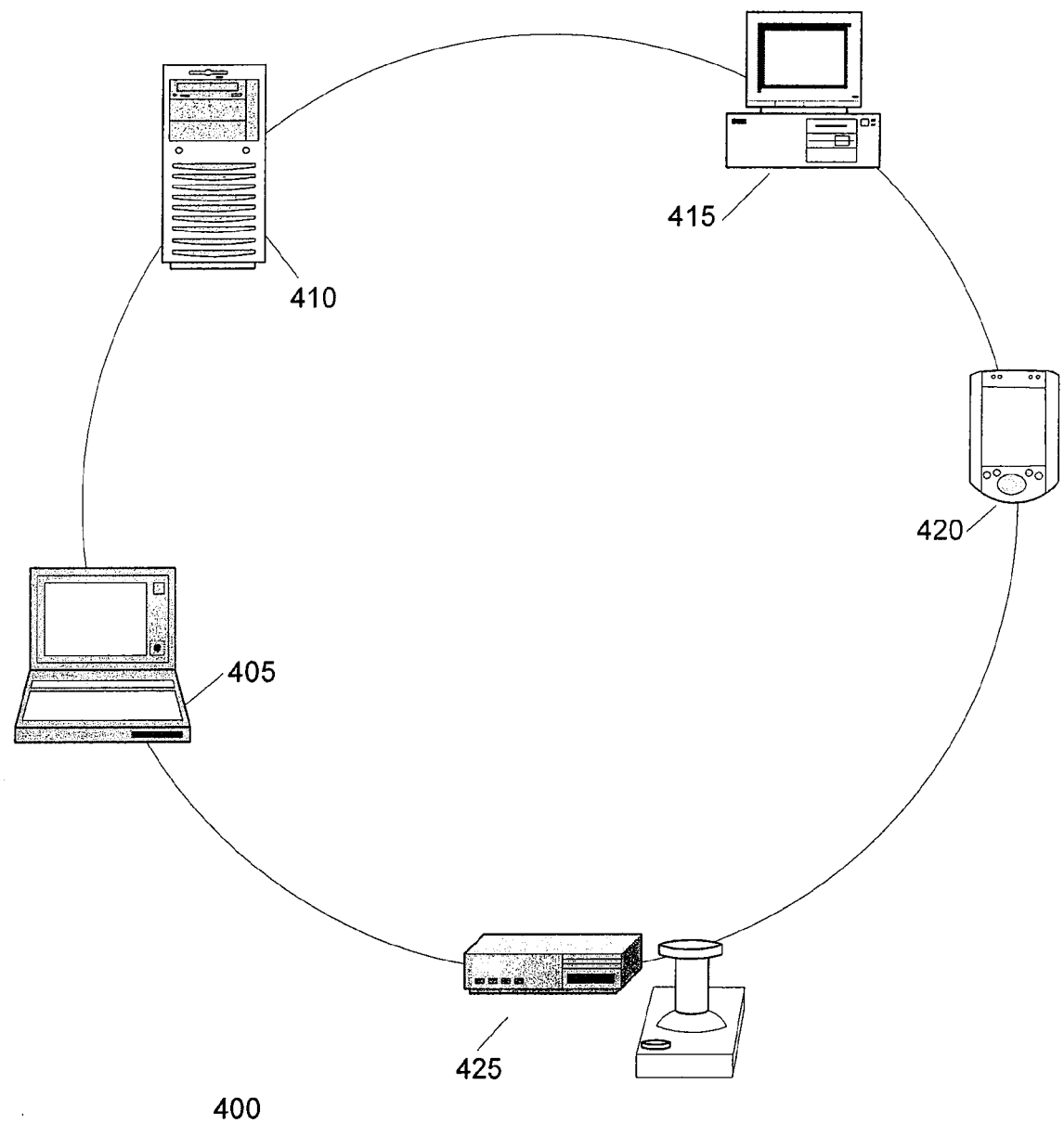
FIG. 4 illustrates a set of information processing devices suitable for implementing an overlay network according to an embodiment of the invention.

FIG. 4 illustrates a set of information processing devices suitable for implementing an overlay network 400 according to an embodiment of the invention. The nodes of overlay network 400 include laptop or portable computers 405; server computers 410; desktop computers and workstations 415; mobile computing devices 420 such as mobile phones, personal digital assistants, portable digital media players, and portable or handheld game consoles; and home entertainment devices 425 such as video game consoles, digital media players, set-top boxes, media center computers and storage devices. Overlay network 400 can include any number of each type of device independent of the number of devices of other types. Each device can implement the functionality of one or more nodes of the overlay network 400. For each device, the functionality of one or more nodes can be implemented as hardware, software, firmware, or any combination thereof. Node functionality in software can be a part of an application, a library, an application programming interface, and/or an operating system. Furthermore, each node of the overlay network 400 can be connected with other nodes via any type of wired or wireless network connection, incorporating any type of electrical, optical, radio, or other communications means. The overlay network 400 can encompass both local-area networks and wide-area networks, such as the Internet.

In a further embodiment, some devices of overlay network 400 may have restricted capabilities. For example, only a limited subset of nodes of overlay network 400 may be allowed to process certain types of network traffic.

Figure 5:
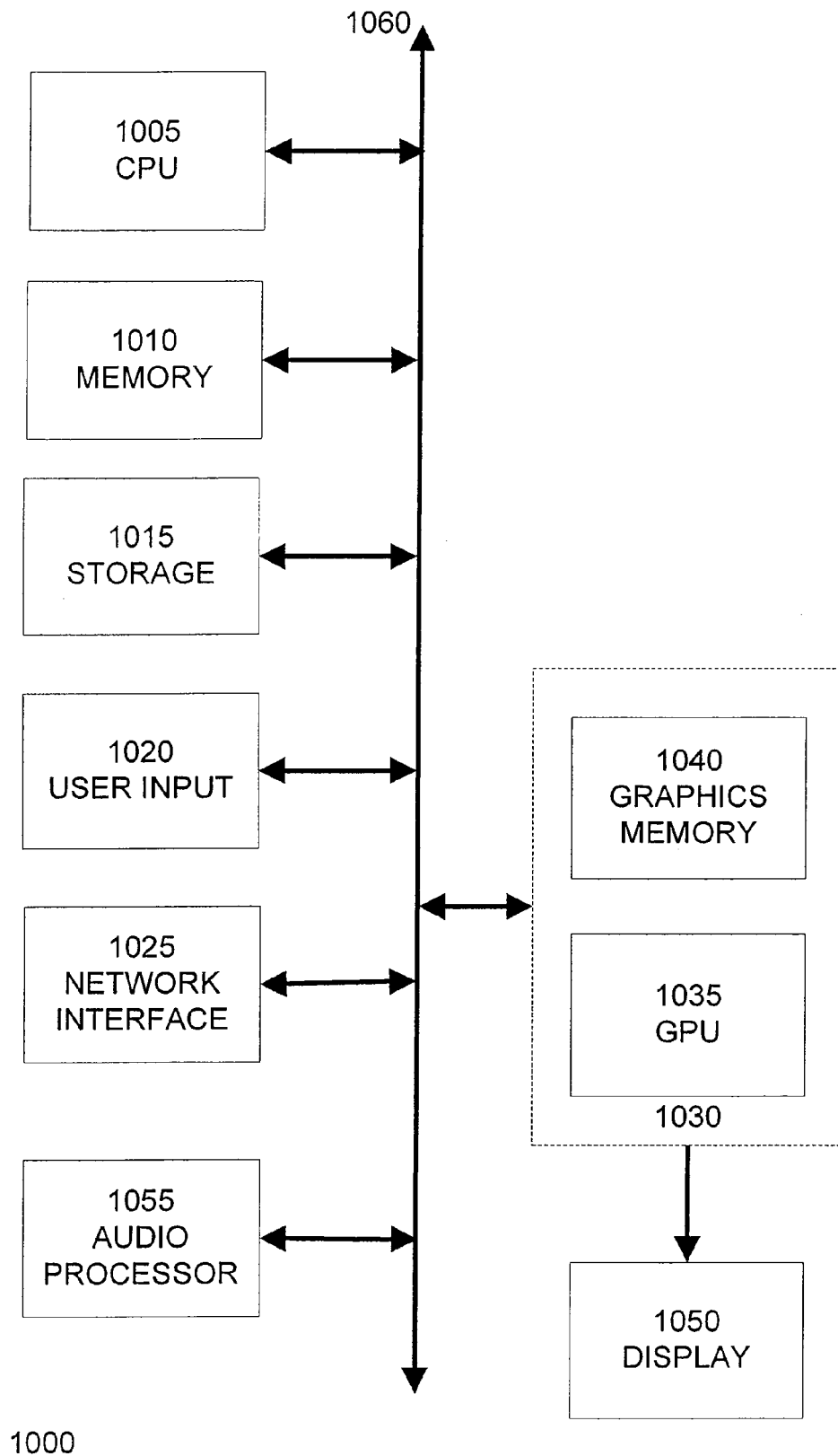
FIG. 5 illustrates a computer system suitable for use with an embodiment of the invention.

FIG. 5 illustrates an example hardware system suitable for implementing an embodiment of the invention. FIG. 5 is a block diagram of a computer system 1000, such as a personal computer, video game console, personal digital assistant, or other digital device, suitable for practicing an embodiment of the invention. Computer system 1000 includes a central processing unit (CPU) 1005 for running software applications and optionally an operating system. CPU 1005 may be comprised of one or more homogeneous or heterogeneous processing cores. Memory 1010 stores applications and data for use by the CPU 1005. Storage 1015 provides non-volatile storage for applications and data and may include fixed disk drives, removable disk drives, flash memory devices, and CD-ROM, DVD-ROM, Blu-ray, HD-DVD, or other optical storage devices. User input devices 1020 communicate user inputs from one or more users to the computer system 1000, examples of which may include keyboards, mice, joysticks, touch pads, touch screens, still or video cameras, and/or microphones. Network interface 1025 allows computer system 1000 to communicate with other computer systems via an electronic communications network, and may include wired or wireless communication over local area networks and wide area networks such as the Internet. An audio processor 1055 is adapted to generate analog or digital audio output from instructions and/or data provided by the CPU 1005, memory 1010, and/or storage 1015. The components of computer system 1000, including CPU 1005, memory 1010, data storage 1015, user input devices 1020, network interface 1025, and audio processor 1055 are connected via one or more data buses 1060.

A graphics subsystem 1030 is further connected with data bus 1060 and the components of the computer system 1000. The graphics subsystem 1030 includes a graphics processing unit (GPU) 1035 and graphics memory 1040. Graphics memory 1040 includes a display memory (e.g., a frame buffer) used for storing pixel data for each pixel of an output image. Graphics memory 1040 can be integrated in the same device as GPU 1035, connected as a separate device with GPU 1035, and/or implemented within memory 1010. Pixel data can be provided to graphics memory 1040 directly from the CPU 1005. Alternatively, CPU 1005 provides the GPU 1035 with data and/or instructions defining the desired output images, from which the GPU 1035 generates the pixel data of one or more output images. The data and/or instructions defining the desired output images can be stored in memory 1010 and/or graphics memory 1040. In an embodiment, the GPU 1035 includes 3D rendering capabilities for generating pixel data for output images from instructions and data defining the geometry, lighting, shading, texturing, motion, and/or camera parameters for a scene. The GPU 1035 can further include one or more programmable execution units capable of executing shader programs.

The graphics subsystem 1030 periodically outputs pixel data for an image from graphics memory 1040 to be displayed on display device 1050. Display device 1050 is any device capable of displaying visual information in response to a signal from the computer system 1000, including CRT, LCD, plasma, and OLED displays. Computer system 1000 can provide the display device 1050 with an analog or digital signal.

In embodiments of the invention, CPU 1005 is one or more general-purpose microprocessors having one or more processing cores. Further embodiments of the invention can be implemented using one or more CPUs with microprocessor architectures specifically adapted for highly parallel and computationally intensive applications, such as media and interactive entertainment applications.

Further embodiments can be envisioned to one of ordinary skill in the art from the specification and figures. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of selecting a neighboring node for a first node in a distributed hash table network, the method comprising:
    determining a desired key value for a node finger table entry;
    requesting a set of candidate neighboring nodes;
    determining a network address translation type of each of the set of candidate neighboring nodes;
    determining a ranking of the set of candidate neighboring nodes based at least in part on a restrictiveness of the network address translation (NAT) type of each of the set of candidate neighboring nodes, wherein a candidate neighboring node with a less restrictive NAT type is ranked higher than a similar candidate neighboring node with a more restrictive NAT type;
    selecting one of the set of candidate neighboring nodes based on the ranking;
    attempting to establish a connection with the selected one of the set of candidate neighboring nodes; and
    adding a reference to the selected one of the set of candidate neighboring nodes to the node finger table entry in response to the connection being successfully established.

2. The method of claim 1, further comprising:
    determining a network address translation type of the first node, wherein the ranking is based at least in part on the network address translation type of the first node.

3. The method of claim 1, wherein requesting a set of candidate neighboring nodes comprises requesting the set of candidate neighboring nodes from a central overlay network server.

4. The method of claim 1, wherein the set of candidate neighboring nodes have key values less than or equal to the desired key value.

5. The method of claim 4, wherein the set of candidate neighboring nodes have key values greater than a key value of a second node finger table entry.

6. The method of claim 1, wherein determining a network address translation type of each of the set of candidate neighboring nodes comprises:
    sending at least one probe message to each of the set of candidate neighboring nodes; and
    analyzing network traffic associated with the probe messages to determine a network address translation type for each of the set of candidate neighboring nodes.

7. The method of claim 1, wherein determining a network address translation type of each of the set of candidate neighboring nodes comprises:
    receiving data from a central overlay network server identifying a network address translation type of each of the set of candidate neighboring nodes.

8. The method of claim 1, wherein the network address translation type is selected from a set of network address translation types, wherein one of the set of network address translation types includes an open network connection without network address translation.

9. The method of claim 1, wherein the network address translation type is selected from a set of network address translation types, wherein one of the set of network address translation types includes a full cone network address translation.

10. The method of claim 1, wherein the network address translation type is selected from a set of network address translation types, wherein one of the set of network address translation types includes a restricted cone network address translation.

11. The method of claim 1, wherein the network address translation type is selected from a set of network address translation types, wherein one of the set of network address translation types includes a port restricted cone network address translation.

12. The method of claim 1, wherein the network address translation type is selected from a set of network address translation types, wherein one of the set of network address translation types includes a symmetric network address translation.

13. The method of claim 1, wherein the ranking is based at least in part on round trip time between the first node and each of the set of candidate neighboring nodes.

14. The method of claim 1, wherein the ranking is based at least in part on node capabilities of each of the set of candidate neighboring nodes.

15. The method of claim 1, wherein the ranking is based at least in part on node bandwidth of each of the set of candidate neighboring nodes.

16. The method of claim 1, wherein the ranking is based at least in part on network quality of service of each of the set of candidate neighboring nodes.

17. The method of claim 1, wherein the ranking is based at least in part on security of each of the set of candidate neighboring nodes.

18. The method of claim 1, wherein determining a ranking of the set of candidate neighboring nodes further comprises evaluating a combination of criteria for each of the set of candidate nodes, the combination of criteria including the NAT type and at least one of a round trip time, a node stability, a device capability, a network bandwidth, a network quality of service, and security information.

19. A computer readable storage medium including instructions adapted to direct a processor to perform an operation comprising:
    determining a desired key value for a node finger table entry;
    requesting a set of candidate neighboring nodes;
    determining a network address translation type of each of the set of candidate neighboring nodes;
    determining a ranking of the set of candidate neighboring nodes based at least in part on a restrictiveness of the network address translation (NAT) type of each of the set of candidate neighboring nodes, wherein a candidate neighboring node with a less restrictive NAT type is ranked higher than a similar candidate neighboring node with a more restrictive NAT type;
    selecting one of the set of candidate neighboring nodes based on the ranking;

attempting to establish a connection with the selected one of the set of candidate neighboring nodes; and adding a reference to the selected one of the set of candidate neighboring nodes to the node finger table entry in response to the connection being successfully established.

20. The computer readable storage medium of claim 19 further comprising:

determining a network address translation type of the first node, wherein the ranking is based at least in part on the network address translation type of the first node.

21. The computer readable storage medium of claim 19, wherein requesting a set of candidate neighboring nodes comprises requesting the set of candidate neighboring nodes from a central overlay network server.

22. The computer readable storage medium of claim 19, wherein the set of candidate neighboring nodes have key values less than or equal to the desired key value.

23. The computer readable storage medium of claim 22, wherein the set of candidate neighboring nodes have key values greater than a key value of a second node finger table entry.

24. The computer readable storage medium of claim 19, wherein determining a network address translation type of each of the set of candidate neighboring nodes comprises:

sending at least one probe message to each of the set of candidate neighboring nodes; and analyzing network traffic associated with the probe messages to determine a network address translation type for each of the set of candidate neighboring nodes.

25. The computer readable storage medium of claim 19, wherein determining a network address translation type of each of the set of candidate neighboring nodes comprises:

receiving data from a central overlay network server identifying a network address translation type of each of the set of candidate neighboring nodes.

26. The computer readable storage medium of claim 19, wherein the network address translation type is selected from a set of network address translation types, wherein one of the set of network address translation types includes an open network connection without network address translation.

27. The computer readable storage medium of claim 19, wherein the network address translation type is selected from a set of network address translation types, wherein one of the set of network address translation types includes a full cone network address translation.

28. The computer readable storage medium of claim 19, wherein the network address translation type is selected from a set of network address translation types, wherein one of the set of network address translation types includes a restricted cone network address translation.

29. The computer readable storage medium of claim 19, wherein the network address translation type is selected from a set of network address translation types, wherein one of the set of network address translation types includes a port restricted cone network address translation.

30. The computer readable storage medium of claim 19, wherein the network address translation type is selected from a set of network address translation types, wherein one of the set of network address translation types includes a symmetric network address translation.

31. The computer readable storage medium of claim 19, wherein the ranking is based at least in part on round trip time between the first node and each of the set of candidate neighboring nodes.

32. The computer readable storage medium of claim 19, wherein the ranking is based at least in part on node capabilities of each of the set of candidate neighboring nodes.

33. The computer readable storage medium of claim 19, wherein the ranking is based at least in part on node bandwidth of each of the set of candidate neighboring nodes.

34. The computer readable storage medium of claim 19, wherein the ranking is based at least in part on network quality of service of each of the set of candidate neighboring nodes.

35. The computer readable storage medium of claim 19, wherein the ranking is based at least in part on security of each of the set of candidate neighboring nodes.

* * * * *